US008095968B2

(12) United States Patent
Cortopassi et al.

(10) Patent No.: US 8,095,968 B2
(45) Date of Patent: Jan. 10, 2012

(54) TECHNIQUES FOR PROVIDING A PERSONAL IDENTIFICATION SECURITY FEATURE TO A PORTABLE COMPUTING DEVICE

(75) Inventors: Michael Cortopassi, Arlington Heights, IL (US); Wayne Hile, Round Lake, IL (US); Thomas Robinson, Crystal lake, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 636 days.

(21) Appl. No.: 11/900,919

(22) Filed: Sep. 12, 2007

(65) Prior Publication Data

US 2008/0098468 A1 Apr. 24, 2008

Related U.S. Application Data

(63) Continuation of application No. 09/605,145, filed on Jun. 24, 2000, now Pat. No. 7,315,949.

(51) Int. Cl.
*G06F 21/20* (2006.01)
*G06F 7/04* (2006.01)
*G06F 15/16* (2006.01)

(52) U.S. Cl. .......... 726/5

(58) Field of Classification Search .......... 726/5
See application file for complete search history.

(56) References Cited

U.S. PATENT DOCUMENTS 5,748,084 A 5/1998 Isikoff
5,898,831 A * 4/1999 Hall et al. .......... 726/3
6,175,922 B1 1/2001 Wang
6,182,142 B1 * 1/2001 Win et al. .......... 709/229
6,285,295 B1 * 9/2001 Casden .......... 340/825.22
6,289,104 B1 9/2001 Patterson et al.
6,323,566 B1 11/2001 Meier
6,601,040 B1 7/2003 Kolls
6,622,124 B1 9/2003 Kolls
6,828,902 B2 * 12/2004 Casden .......... 340/10.3

OTHER PUBLICATIONS

Amir M. Sodagar et al., Extremely Wide Range Indepedent CMOS Voltage References for Telemtry Powering Applications. Mar. 2006. Analog Integrated Circuits and Signal Processing. vol. 46, Issue 3. pp. 1-9.*

* cited by examiner

*Primary Examiner* — Kambiz Zand
*Assistant Examiner* — Aubrey Wyszynski

(57) ABSTRACT

One embodiment in accordance with the present invention includes implementing a personal digital assistant (PDA) with a wireless personal identification mechanism. Specifically, the wireless identification mechanism can be a radio frequency identification (RFID) integrated circuit which is incorporated on the inside of the rear housing (e.g., plastic) of the personal digital assistant. Once the radio frequency identification integrated circuit has been implemented with an authorized security code, the personal digital assistant in accordance with the present embodiment is capable of functioning as a "key" enabling entry into restricted areas which are secured with non-contact radio frequency security systems such as corporate campuses, buildings, and/or laboratories. In this manner, an authorized person does not have to carry around a separate radio frequency keycard in order to gain access to restricted areas.

17 Claims, 12 Drawing Sheets

100b

TECHNIQUES FOR PROVIDING A PERSONAL IDENTIFICATION SECURITY FEATURE TO A PORTABLE COMPUTING DEVICE

CROSS-REFERENCE TO RELATED APPLICATIONS

This is a continuation of application Ser. No. 09/605,145 filed Jun. 24, 2000 now U.S. Pat. No. 7,315,949.

BACKGROUND OF THE INVENTION

There have been many advances within genetic research, chemistry, biology, and fabrication processes. Modern research and technology have also provided society with a wide variety of electronic devices. It is appreciated that some of these modern electronic devices are very powerful and useful to their users. For example, some of the electronic devices which fall into this category include: computers which occupy large office space down to computers which are held in one's hand, satellites which orbit around the earth relaying a multitude of communication signals, global positioning system (GPS) devices capable of determining the specific locations of their users on the earth, cellular phones which enable their users to communicate wirelessly with other people, to name a few. Additionally, it is also appreciated that some modern electronic devices also provide entertainment to their users. For instance, some of the electronic devices which fall into this category include: portable and fixed radio receivers which provide their users music along with a wide array of different audio programming, video game consoles which challenge their users with varying situations within different virtual realities, portable and fixed compact disc (CD) players which provide music to their users, and televisions which provide a wide variety of visual and audio programming to their users.

It is appreciated that many companies and businesses continuously strive to improve, develop, and discover new technologies. However, these continuous efforts typically involve increased expenditures by the particular company or business. Additionally, when important research and development come to fruition, they become even more valuable to the developing company or business. As such, the developing company or business is extremely interested in keeping their confidential research and development protected from being easily acquired or stolen by other competing companies and businesses.

There are a wide variety of ways a company or business may protect their valuable confidential research and development. For example, when a company is transmitting confidential information over a public network (e.g., telephone network, the Internet, etc.), they may utilize some type of encryption and decryption program in order to keep the information secure. Furthermore, the company may install video cameras which are strategically placed throughout their corporate campus in order to provide surveillance of certain buildings and/or highly restricted areas. Moreover, the company may also hire security guards which check employee identification badges when an employee enters and/or exits corporate buildings and/or certain restricted areas of a corporate building. Additionally, the security guards may monitor specific activities occurring inside and outside of corporate buildings.

Another way that a company may protect their valuable confidential research and development is to run background checks on prospective employees in order to determine if they present some type of potential security breach to the hiring company. A background check may include the accumulation of a wide variety of information about a prospective employee. For example, a background check may include determining all of the previous employment of a prospective employee and talking with their previous bosses in order to inquire whether the prospective employee ever caused any problems while working at those jobs. Furthermore, the background check may include contacting city, state, and/or federal law enforcement agencies in order to ascertain whether the prospective employee has any type of criminal record. The background check may also include determining what organizations the prospective employee is currently a member of or has ever been a member of in the past.

Additionally, another way that a company can protect their valuable confidential research and development is to restrict unauthorized people from having access to their corporate campuses, buildings, laboratories, and the like. One of the typical ways of doing this is to utilize a personal non-contact security keycard system to regulate the flow of people into these particular restricted areas. The general idea of this type of system is that only those individuals with an authorized security keycard are able to enter restricted areas. Typically, these security keycards take the form of a badge about the size of a credit card which authorized personnel carry around with them in order to enter and/or exit different restricted areas of a corporate campus and/or building. These security keycards sometime include some type of clip device enabling the keycard to be attach to an authorized person's clothing. However, another common way of enabling an authorized person to carrying around his or her security keycard is to implement it with a necklace thereby enabling an authorized person to constantly wear the keycard around their neck.

It should be appreciated that there are disadvantages associated with a non-contact keycard security system. For example, one of the disadvantages is that a keycard is just another item which an authorized person has to carry with them as they travel around a corporate campus or within different areas of a corporate building. In other words, authorized personnel of a company or business typically find it undesirable to carry around more and more items with them.

SUMMARY OF THE INVENTION

Accordingly, what is needed is a method and system for incorporating non-contact keycard technology into another device (e.g., personal digital assistant) that an authorized person typically carries around with them. The present invention provides this advantage and others which will no doubt become obvious to those of ordinary skill in the art after having read the following detailed description of embodiments in accordance with the present invention.

For example, one embodiment in accordance with the present invention includes implementing a personal digital assistant (PDA) with a wireless personal identification mechanism. Specifically, the wireless identification mechanism can be a radio frequency identification (RFID) integrated circuit which is incorporated on the inside of the rear housing (e.g., plastic) of the personal digital assistant. Once the radio frequency identification integrated circuit has been implemented with an authorized security code, the personal digital assistant in accordance with the present embodiment is capable of functioning as a "key" enabling entry into restricted areas which are secured with non-contact radio frequency security systems such as corporate campuses, buildings, and/or laboratories. In this manner, an authorized person does not have to carry around a separate radio frequency keycard in order to gain access to restricted areas.

In another embodiment, the present invention includes a system for providing a personal identification security feature with a portable computing device. The system includes a portable computing device. Furthermore, the system includes an identification security feature incorporated with the portable computing device. Within the present embodiment, the identification security feature capable of unlocking a locking mechanism of an entryway.

In yet another embodiment, the present invention includes a method for providing a personal identification security feature with a portable computing device. Specifically, the method includes the step of installing an identification security feature with a portable computing device. Additionally, the method includes the step of installing a security code with the identification security feature. Moreover, the method includes the step of selectively transmitting the security code.

BRIEF DESCRIPTION OF THE DRAWINGS

Embodiments of the present invention are illustrated by way of example and not by way of limitation, in the figures of the accompanying drawings and in which like reference numerals refer to similar elements and in which.

Figure 1:
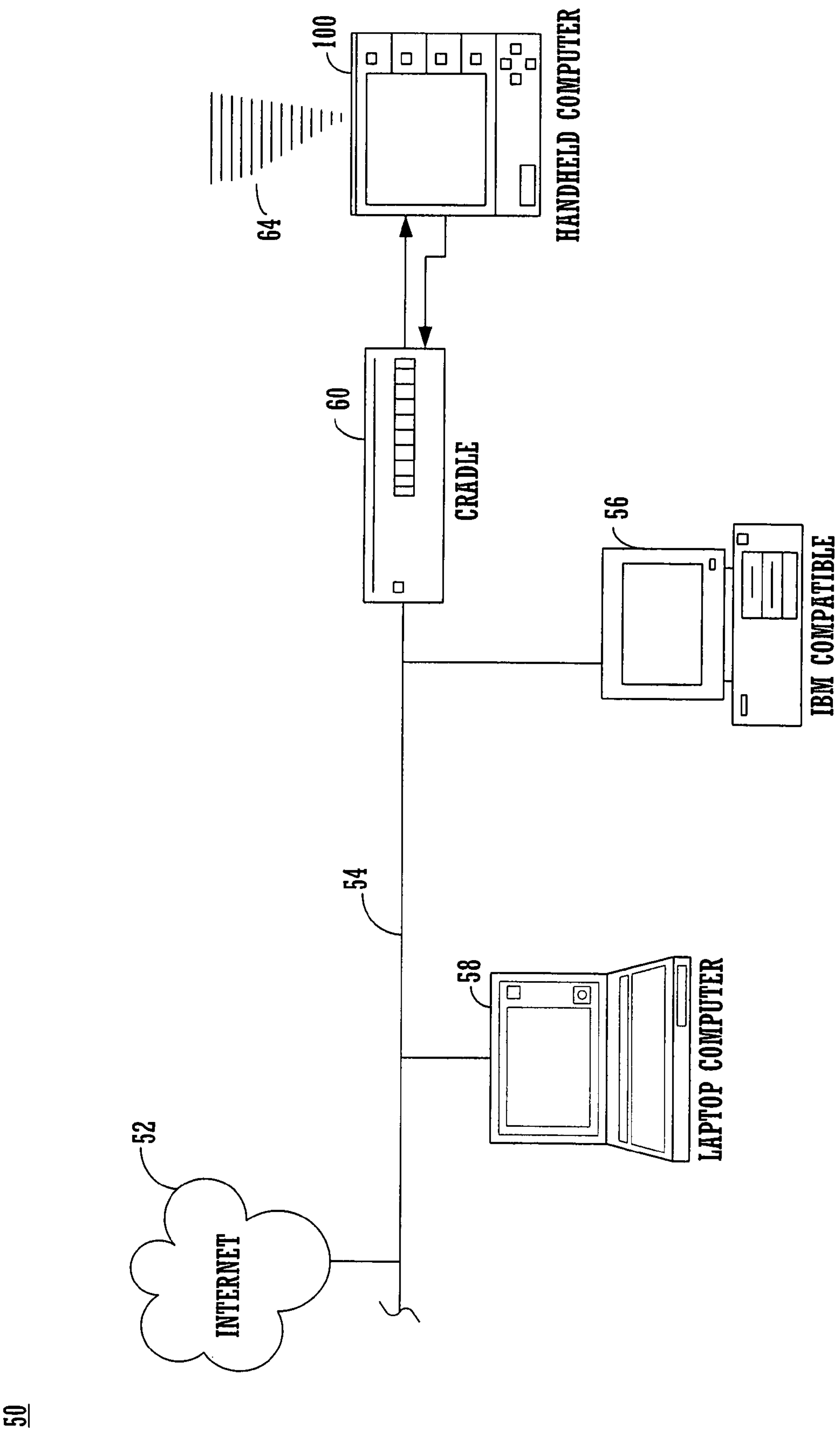
FIG. 1 is a system illustration of an exemplary personal digital assistant computer system connected to other computer systems and the Internet via a cradle device.

The drawings referred to in this description should not be understood as being drawn to scale except if specifically noted.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as “implementing”, “installing”, “outputting”, “generating”, “receiving”, “unlocking”, “transmitting”, “determining”, “using” or the like, refer to the actions and processes of a computer system, or similar electronic device including a personal digital assistant (PDA). The computer system or similar electronic computing device manipulates and transforms data represented as physical (electronic) quantities within the computer system’s registers and memories into other data similarly represented as physical quantities within the computer system memories or registers or other such information storage, transmission, or display devices. The present invention is also well suited to the use of other computer systems such as, for example, optical and mechanical computers.

The present invention generally relates to the field of portable electronic devices. More particularly, the present invention relates to the field of personal digital assistants (PDAs) and other similar types of portable electronic devices. Referring now to FIG. 1, a system 50 that can be used in conjunction with the present invention is shown. It is appreciated that the personal identification security system of the present invention can be used in conjunction with any personal digital assistant and/or portable computer system and that system 50 is exemplary. It is further appreciated that the computer system 100 described below is only exemplary. System 50 comprises a host computer system 56 which can either be a desktop unit as shown, or, alternatively, can be a laptop computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc.

Optionally, bus 54 can provide communication with the Internet 52 using a number of well known protocols.

Importantly, bus 54 is also coupled to a cradle 60 for receiving and initiating communication with a personal digital assistant computer system 100. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
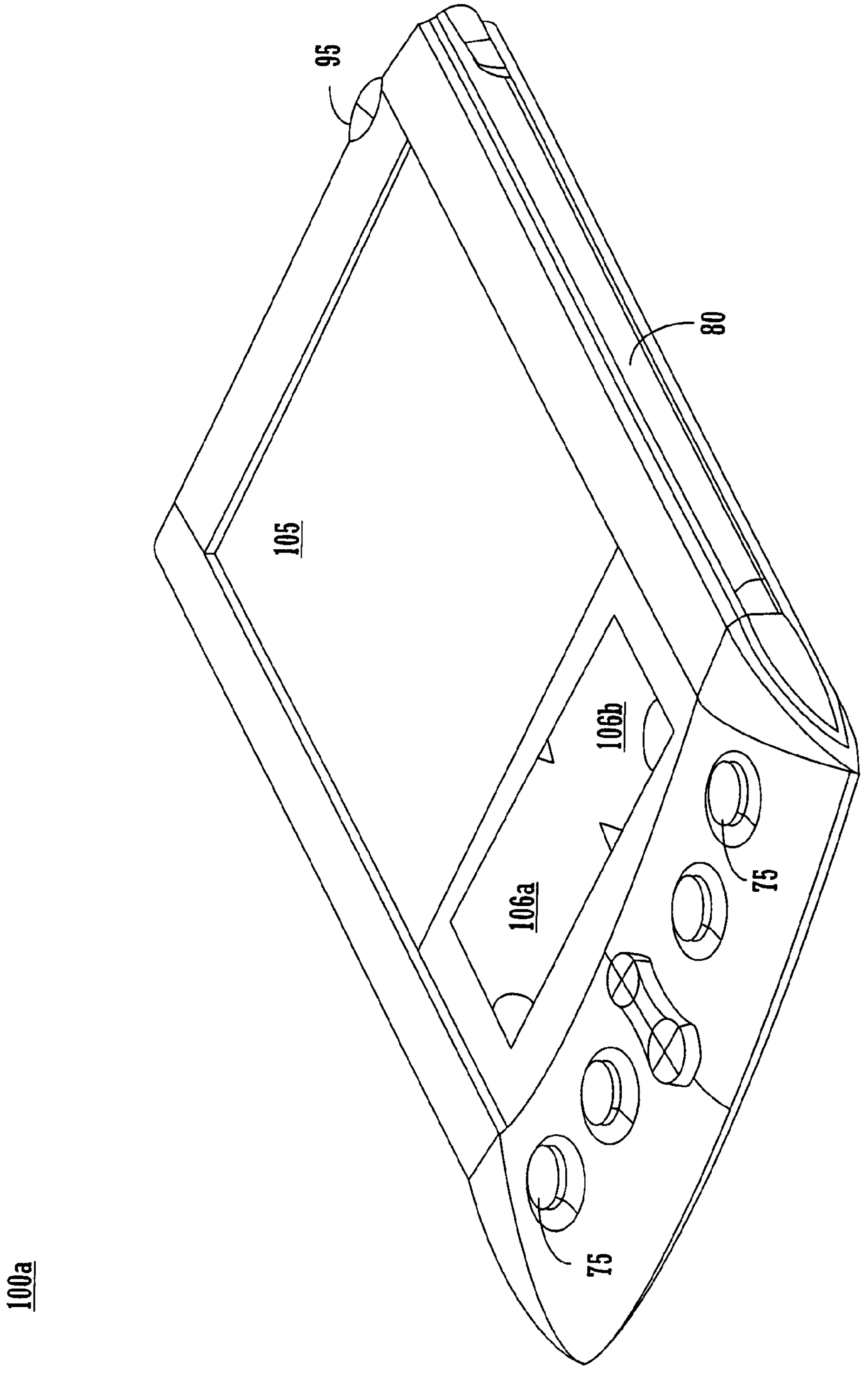
FIG. 2A is a top side perspective view of an exemplary personal digital assistant computer system.

With reference to FIG. 2A, a perspective illustration of the top face 100*a* of exemplary personal digital assistant computer system 100 is shown. The top face 100*a* contains a display screen 105 surrounded by a bezel or cover. A removable stylus 80 is also shown. The display screen 105 is a touch screen capable of registering contact between the screen and the tip of stylus 80. The stylus 80 can be fabricated of any material which can make contact with the screen 105. The top face 100*a* also contains one or more dedicated and/or programmable buttons 75 for selecting information and causing the computer system 100 to implement functions. The on/off button 95 is also shown.

FIG. 2A also illustrates a handwriting recognition pad or "digitizer" containing regions 106*a* and 106*b*. Specifically, region 106*a* is for the drawing of alpha characters therein for automatic recognition and region 106*b* is for the drawing of numeric characters therein for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 2B:
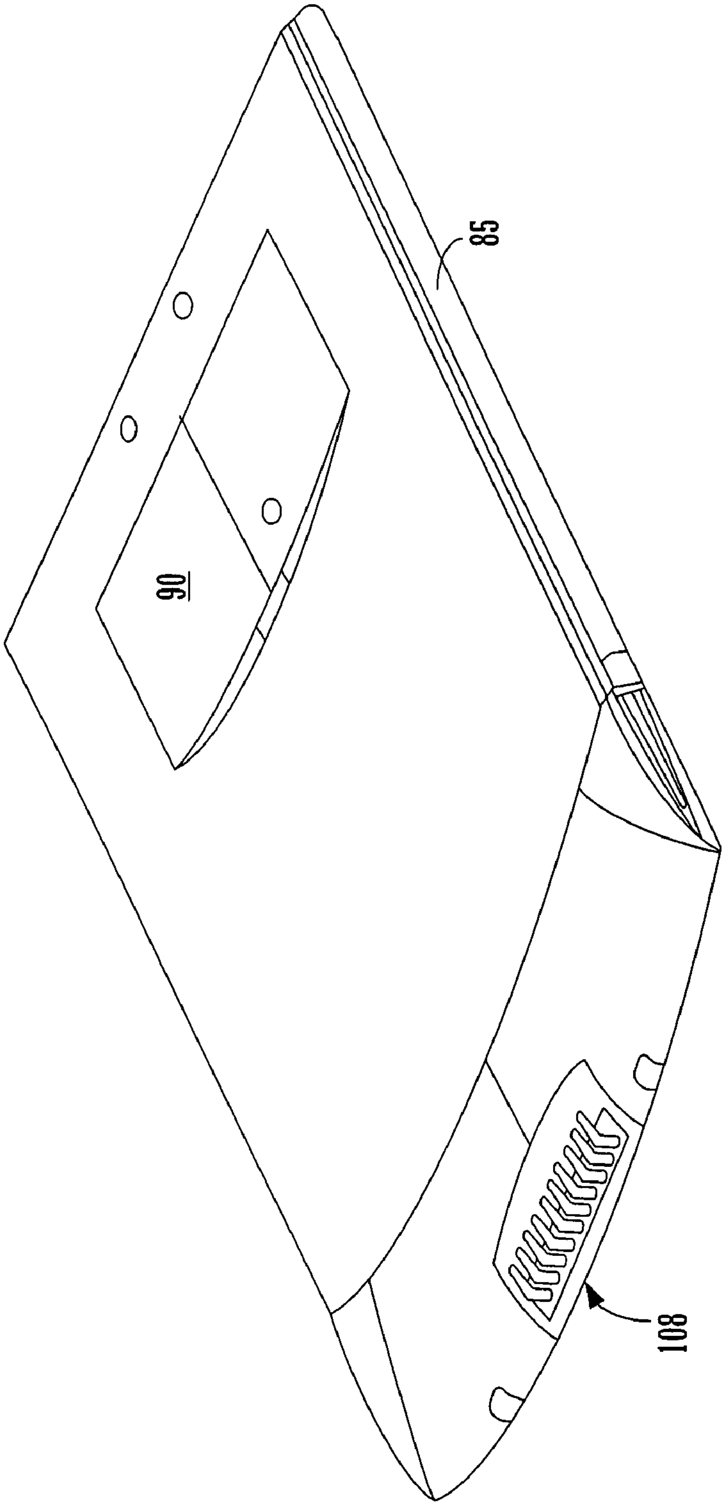
FIG. 2B is a bottom side perspective view of the exemplary personal digital assistant computer system of FIG. 2A.

FIG. 2B illustrates the bottom side 100*b* of one embodiment of the personal digital assistant computer system 100. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, small computer system interface (SCSI), Ethernet, Firewire (IEEE 1394), etc.

Figure 3:
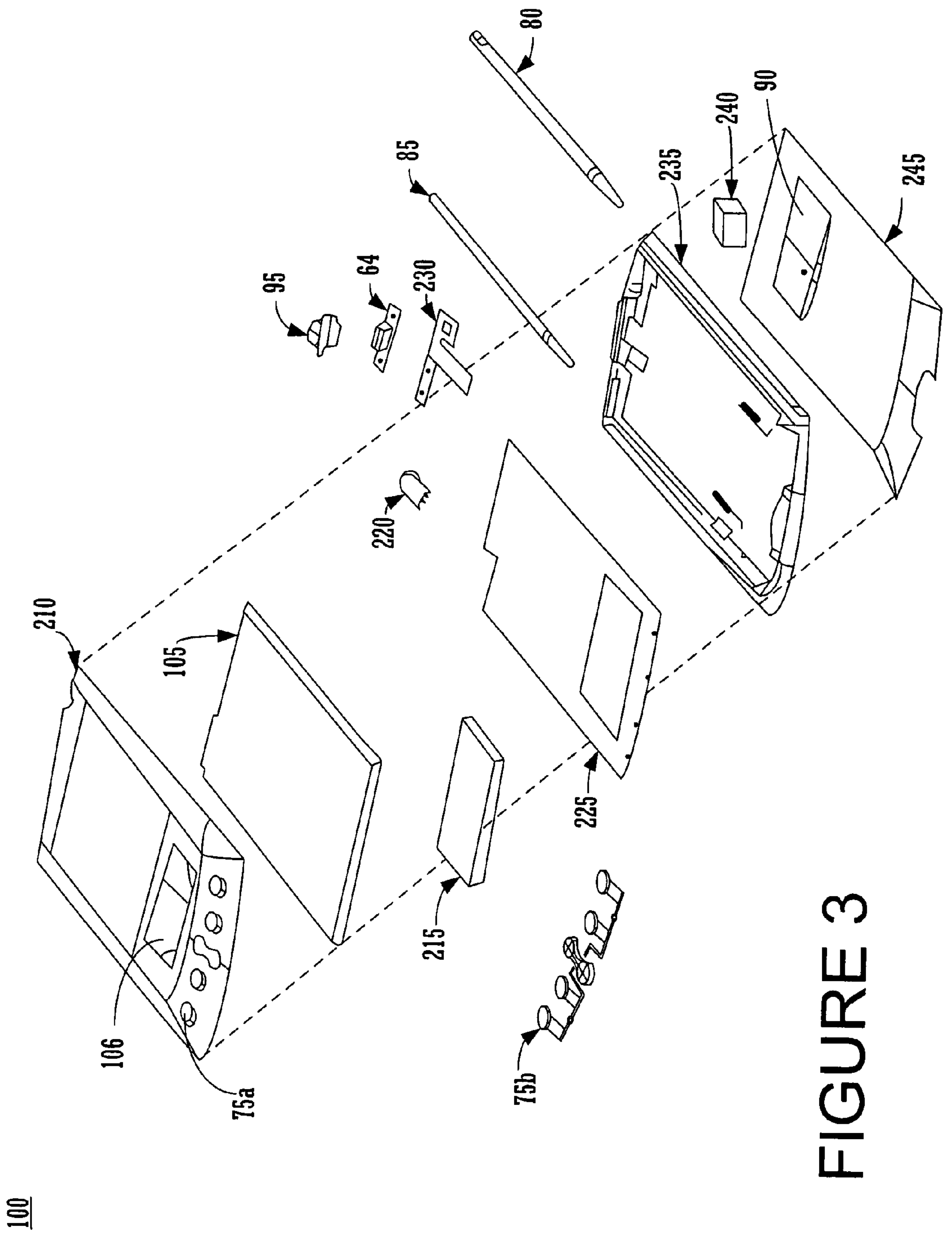
FIG. 3 is an exploded view of the components of the exemplary personal digital assistant computer system of FIG. 2A.

With reference now to FIG. 3, an exploded view of the exemplary personal digital assistant computer system 100 is shown. System 100 contains a front cover 210 having an outline of region 106 and holes 75*a* for receiving buttons 75*b*. A flat panel display 105 (both liquid crystal display and touch screen) fits into front cover 210. Any of a number of display technologies can be used, e.g., liquid crystal display (LCD), field emission device (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A midframe 235 is shown along with stylus 80. Position adjustable antenna 85 is also shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server.

Figure 4:
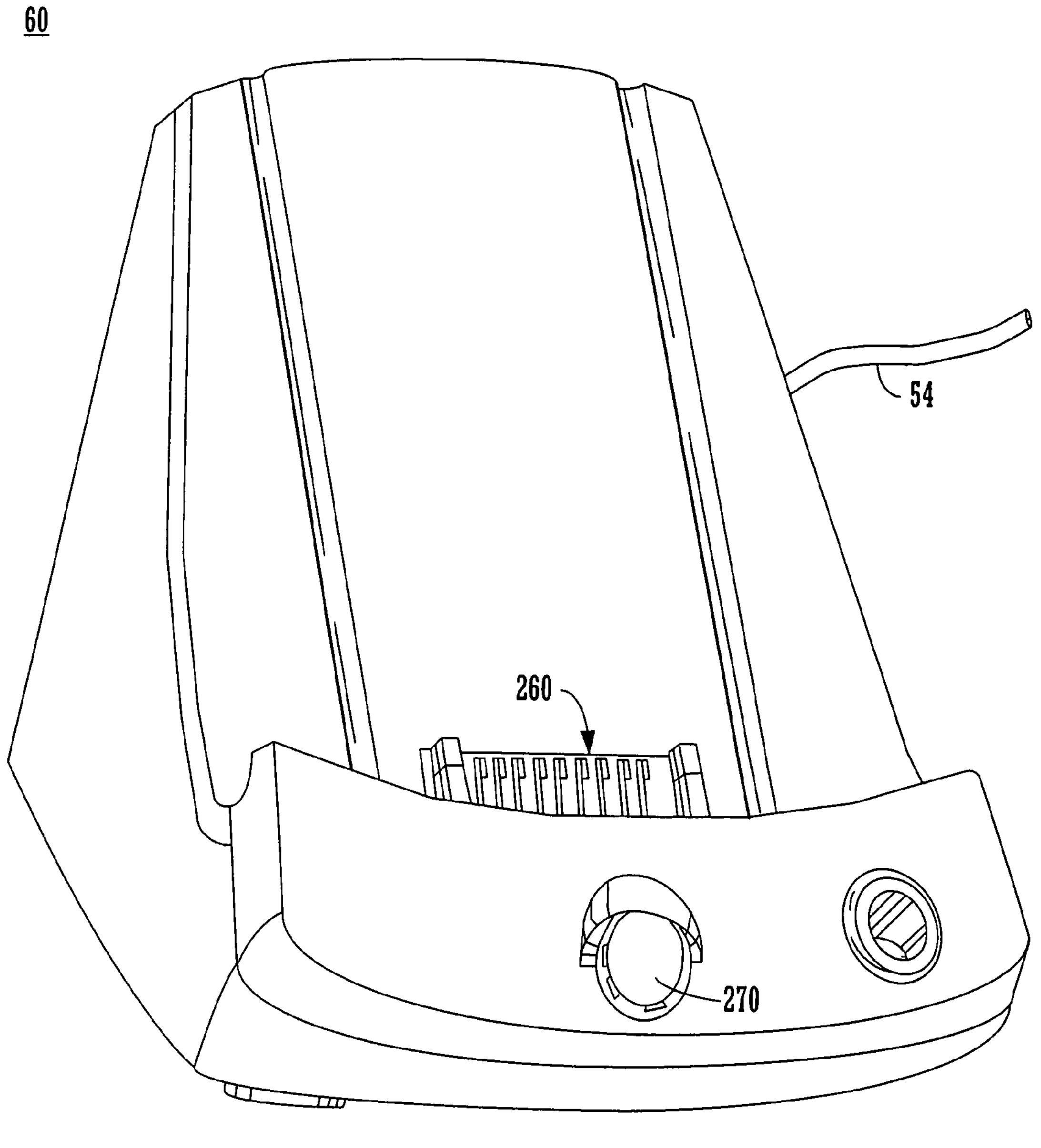
FIG. 4 is a perspective view of the cradle device for connecting the personal digital assistant computer system to other systems via a communication interface.

FIG. 4 is a perspective illustration of one embodiment of the cradle 60 for receiving the personal digital assistant computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication bus 54.

Figure 5:
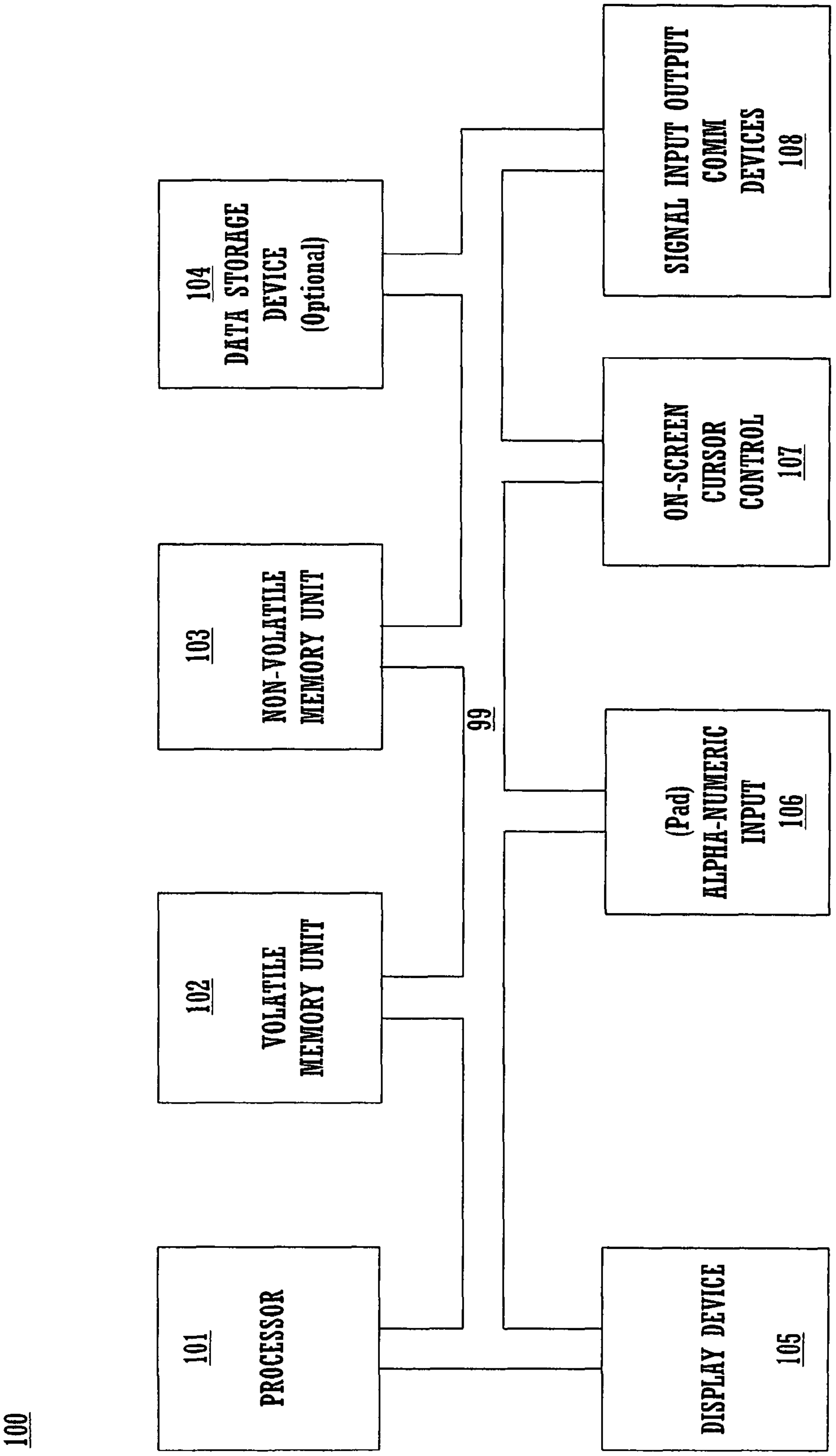
FIG. 5 is a logical block diagram of circuitry located within the exemplary personal digital assistant computer system of FIG. 2A.

FIG. 5 illustrates circuitry of exemplary personal digital assistant computer system 100, some of which can be implemented on PC board 225. Computer system 100 includes an address/data bus 99 for communicating information, a central processor 101 coupled with the bus 99 for processing information and instructions, a volatile memory unit 102 (e.g., random access memory, static RAM, dynamic RAM, etc.) coupled with the bus 99 for storing information and instructions for the central processor 101 and a non-volatile memory unit 103 (e.g., read only memory, programmable ROM, flash memory, EPROM, EEPROM, etc.) coupled with the bus 99 for storing static information and instructions for the processor 101. Computer system 100 also includes an optional data storage device 104 (e.g., memory stick) coupled with the bus 99 for storing information and instructions. It should be appreciated that data storage device 104 can be removable. As described above, system 100 also contains a display device 105 coupled to the bus 99 for displaying information to the computer user. PC board 225 can contain the processor 101, the bus 99, the volatile memory unit 102, and the non-volatile memory unit 103.

Also included in computer system 100 of FIG. 5 is an optional alphanumeric input device 106 which in one implementation is a handwriting recognition pad ("digitizer") having regions 106*a* and 106*b* (FIG. 2A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where a stylus makes contact. The display device 105 utilized with the computer system 100 may be a liquid crystal device (LCD), cathode ray tube (CRT), field emission device (FED, also called flat panel CRT) or other display device suitable for creating graphic images and alphanumeric characters recognizable to the user. In the preferred embodiment, display 105 is a flat panel display. Computer system 100 also includes signal communication interface 108, which is also coupled to bus 99, and can be a serial port for communicating with the cradle 60. Device 108 can also include an infrared communication port.

Figure 6A:
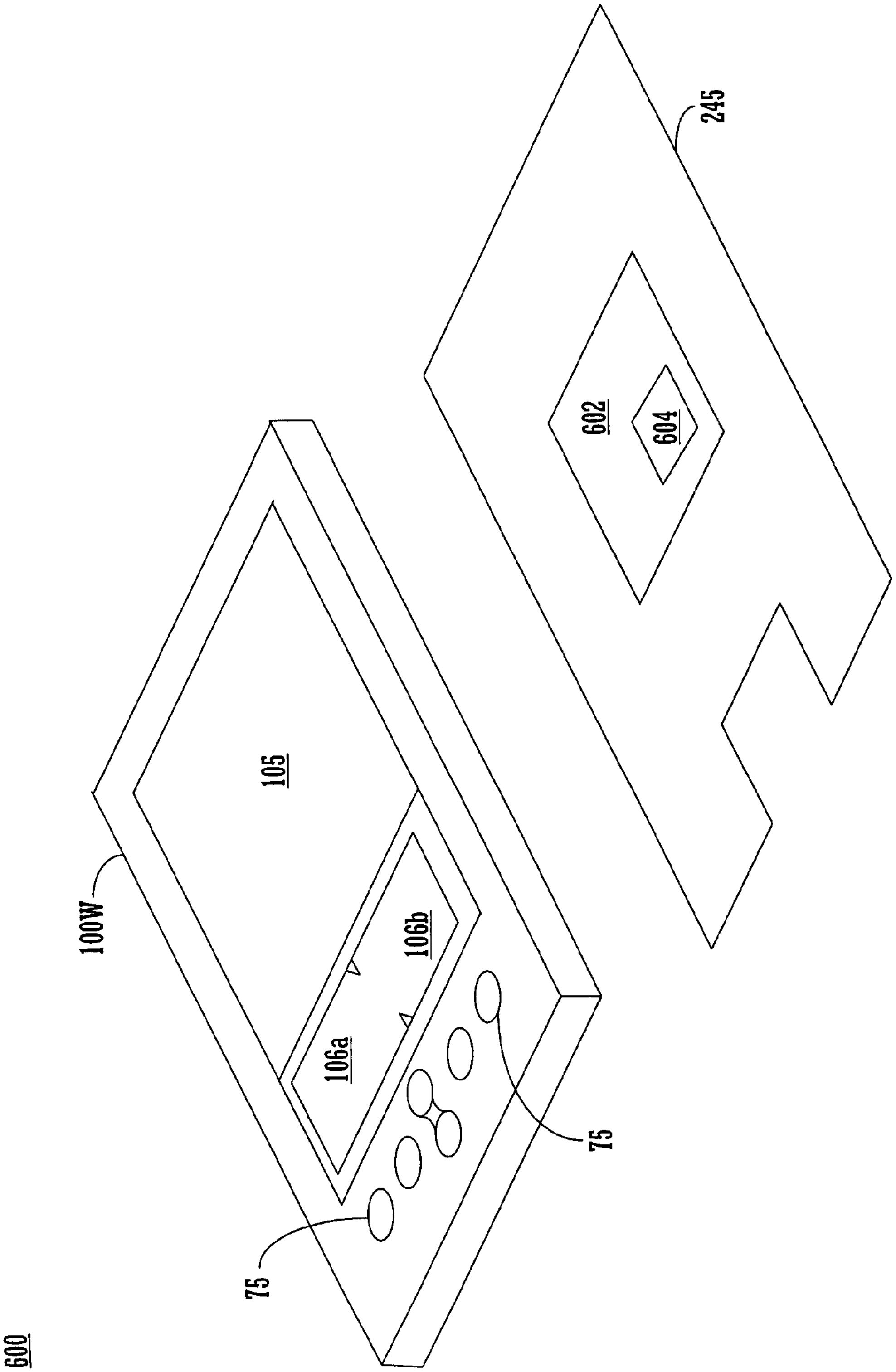
FIG. 6A is a perspective view of a personal identification security system in accordance with one embodiment of the present invention.

Personal Identification Security System in Accordance with the Present Invention With reference now to FIG. 6A, a perspective view of a personal identification security system 600 in accordance with one embodiment of the present invention is shown. The personal identification security system 600 of the present embodiment includes portable computing device 100*w* (e.g., personal digital assistant) implemented with a built-in radio frequency identification (RFID) tag or integrated circuit 602 (which is a personal identification security feature). For example, the radio frequency identification integrated circuit 602 is incorporated on the inside of the rear plastic housing 245 of personal digital assistant 100*w*. However, radio frequency identification integrated circuit 602 of the present embodiment is well suited to be incorporated with portable computing device 100*w* in many different ways. Once an authorized security code is installed within the radio frequency identification integrated circuit 602, portable computing device 100*w* in accordance with the present embodiment is capable of functioning as a "key" enabling entry into and/or exit from restricted areas which are secured with non-contact radio frequency security systems such as corporate campuses, buildings, and/or laboratories. In this manner, an authorized person does not have to carry around a separate radio frequency keycard in order to gain access to and/or exit from restricted areas.

Within the present embodiment, radio frequency identification integrated circuit 602 includes a memory device 604 for storing one or more security codes and/or passwords (which may be unique and/or common). Additionally, memory device 604 can also store other information and data. Furthermore, memory device 604 of the radio frequency identification tag 602 is flash memory, but may be implemented with many different types of memory devices in accordance with the present embodiment. It is understood that a radio frequency identification (RFID) tag or integrated circuit are well known by those of ordinary skill in the art.

Referring still to FIG. 6A, it should be appreciated that the RFID integrated circuit 602 of the present embodiment may be optionally coupled to processor 101 (FIG. 5) of personal digital assistant 100*w*. Implemented in this fashion, software operating on processor 101 has the capability of keeping track of the time and date (for example) personal digital assistant 100*w* entered and/or exited a restricted area such as a building and/or laboratory. In this manner, a personal log can be created by software operating on personal digital assistant 100*w* thereby documenting its ingress and egress of restricted areas. It is understood that when processor 101 is coupled to RFID integrated circuit 602, the present embodiment is well suited to accommodate a wide variety of software and/or hardware implementations which operate in conjunction with the "key" functionality of portable computer system 100*w*.

Portable computing device 100*w* of the present embodiment is well suited to be implemented as an extremely wide variety of devices. For example, portable computing device 100*w* may be implemented as a portable telephone, portable laptop computer system, personal digital assistant, pager, calculator, and the like.

It should be appreciated that the authorized security code stored within memory device 604 of RFID tag 602 can be initially programmed and stored in a wide variety of ways. For example, the RFID integrated circuit 602 may be placed in front of a master programmer device which can erase and program memory device 604 with the proper authorized security code or password along with any other data and information that is desirable. Furthermore, if RFID tag 602 is coupled to processor 101 of portable computer system 100*w*, the authorized security code can be initially programmed and stored within memory device 604 by interfacing with the controls of portable computer system 100*w*. Moreover, if RFID tag 602 is coupled to processor 101 of portable computer system 100*w*, the authorized security code can be initially programmed and stored within memory device 604 via communication interface 108 of portable computer system 100*w*.

Figure 6B:
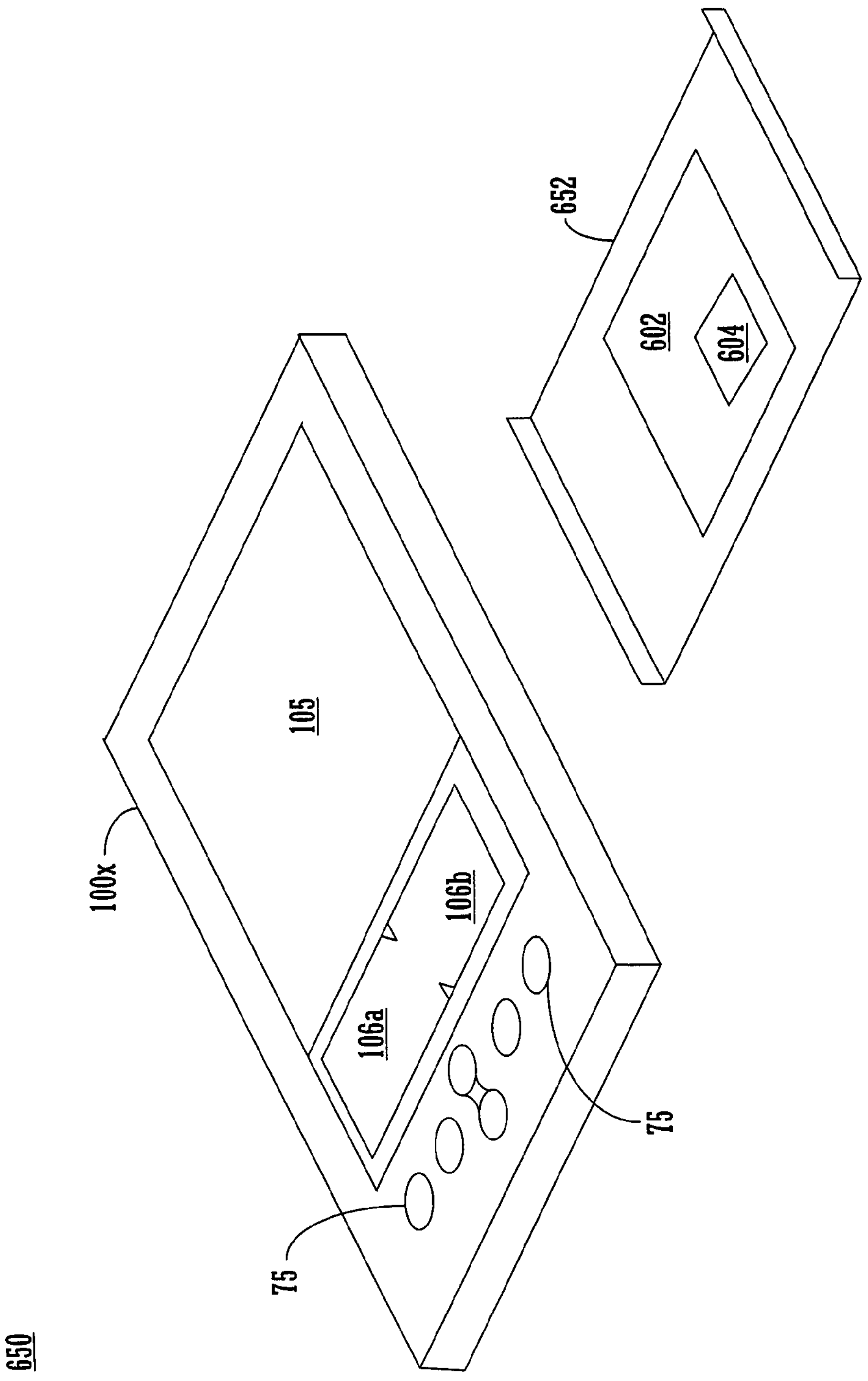
FIG. 6B is a perspective view of a personal identification security system in accordance with another embodiment of the present invention.

FIG. 6B is a perspective view of a personal identification security system 650 in accordance with one embodiment of the present invention. The personal identification security system 650 of the present embodiment includes RFID tag 602 as an add-on feature to an existing portable computing device 100*x* (e.g., personal digital assistant). For example, RFID integrated circuit 602 of the present embodiment is incorporated with a snap-on adapter 652 which is fabricated to couple (for example) to the back of the existing portable computing device 100*x*. Snap-on adapter 652 may be fabricated from a extremely wide variety of materials (e.g., plastic, nylon, carbon fiber, etc.) and in many different shapes in accordance with the present embodiment. The snap-on adapter 652 (in conjunction with RFID tag 602) is very thin (e.g., 2 millimeters) such that it does not significantly increase the overall thickness of portable computing device 100*x*. In this manner, portable computing device 100*x* together with snap-on adapter 652 operates in a manner similar to portable computer system 100*w* (FIG. 6A) which has a built-in RFID integrated circuit 602, as described above. It should be appreciated that RFID tag 602 and memory device 604 of FIG. 6B are the same components as RFID tag 602 and memory device 604 of FIG. 6A, described above.

Figure 7:
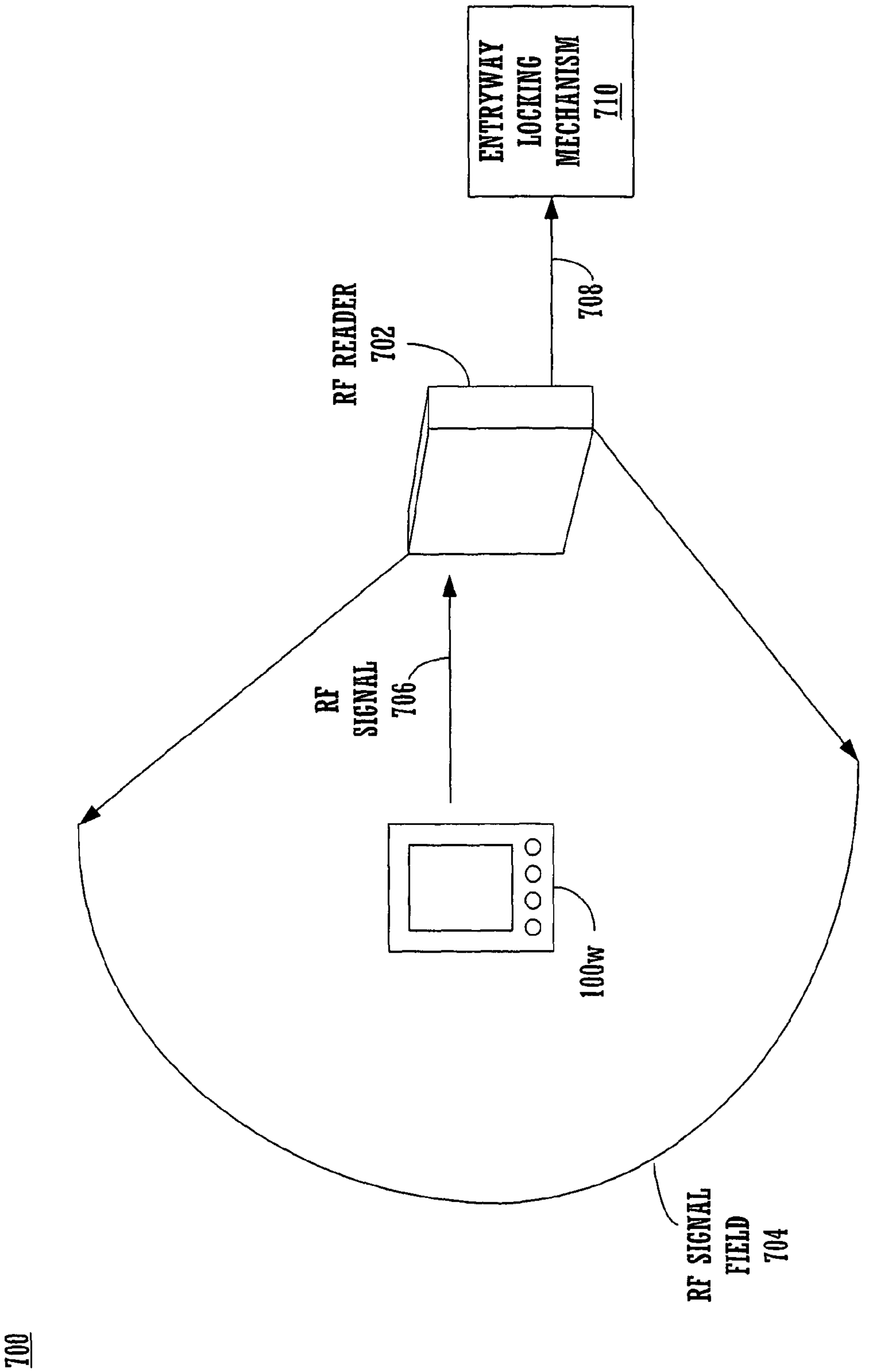
FIG. 7 illustrates a non-contact radio frequency security system in accordance with an embodiment of the present invention.

FIG. 7 illustrates a non-contact radio frequency security system 700 in accordance with an embodiment of the present invention wherein portable computer device 100*w* and/or 100*x* may operate. The non-contact radio frequency (RF) security system 700 is typically utilized to restrict unauthorized individuals from gaining access to a particular area (e.g., building, laboratory, etc.). Specifically, when an authorized RF security code signal is received by a radio frequency (RF) reader device 702, it causes an entryway locking mechanism 710 to temporarily unlock an entryway (not shown) enabling one or more people to pass through it.

More specifically, RF reader device 702 continually outputs a RF signal field 704 which may have a range of a couple of feet. It is appreciated that RFID integrated circuit 602 (FIGS. 6A and 6B) of portable computer devices 100*w* and 100*x* are inactive except when located within a strong RF signal field such as RF signal field 704. Therefore, when portable computer system 100*w* or 100*x* enters and is enveloped by RF signal field 704, RFID integrated circuit 602 picks up enough RF energy from RF signal field 704 to cause it to become energized. Once energized, RFID integrated circuit 602 outputs an RF signal 706. Moreover, the RF signal 706 contains the security code and/or password which was previously stored within memory device 604 of RFID integrated circuit 602. In other words, RFID integrated circuit 602 automatically generates and broadcasts RF signal 706 which contains the security code. Upon receiving RF signal 706, RF reader device 702 determines whether the received security code of RF signal 706 has been authorized to enter the particular secured area. If the security code is not an authorized security code, RF reader device 702 does not cause the entryway to be unlocked. However, if RF reader device 702 determines the security code of RF signal 706 is authorized, RF reader device 702 outputs a release signal 708 to entryway locking mechanism 710. Upon receiving release signal 708, entryway locking mechanism 710 unlocks the entryway enabling one or more people to pass through it.

Therefore, portable computer systems 100*w* and 100*x* provide more convenience to their user. For example, RFID tag 602 of portable computer system 100*w* or 100*x* is capable of operating while still in a pocket of its user. As such, the user just has to get RFID integrated circuit 602 close enough to RF reader device 702 in order to activate RFID integrated circuit 602. Therefore, locking mechanism 710 will unlock the entryway and the user did not even have to remove portable computer system 100*w* or 100*x* from their pocket in order to enter a restricted area. Another advantage of the present embodiment is that portable computer systems 100*w* and 100*x* may be utilized in conjunction with current RF keycard readers which are already installed at different corporate campuses, buildings, and laboratories.

Figure 8:
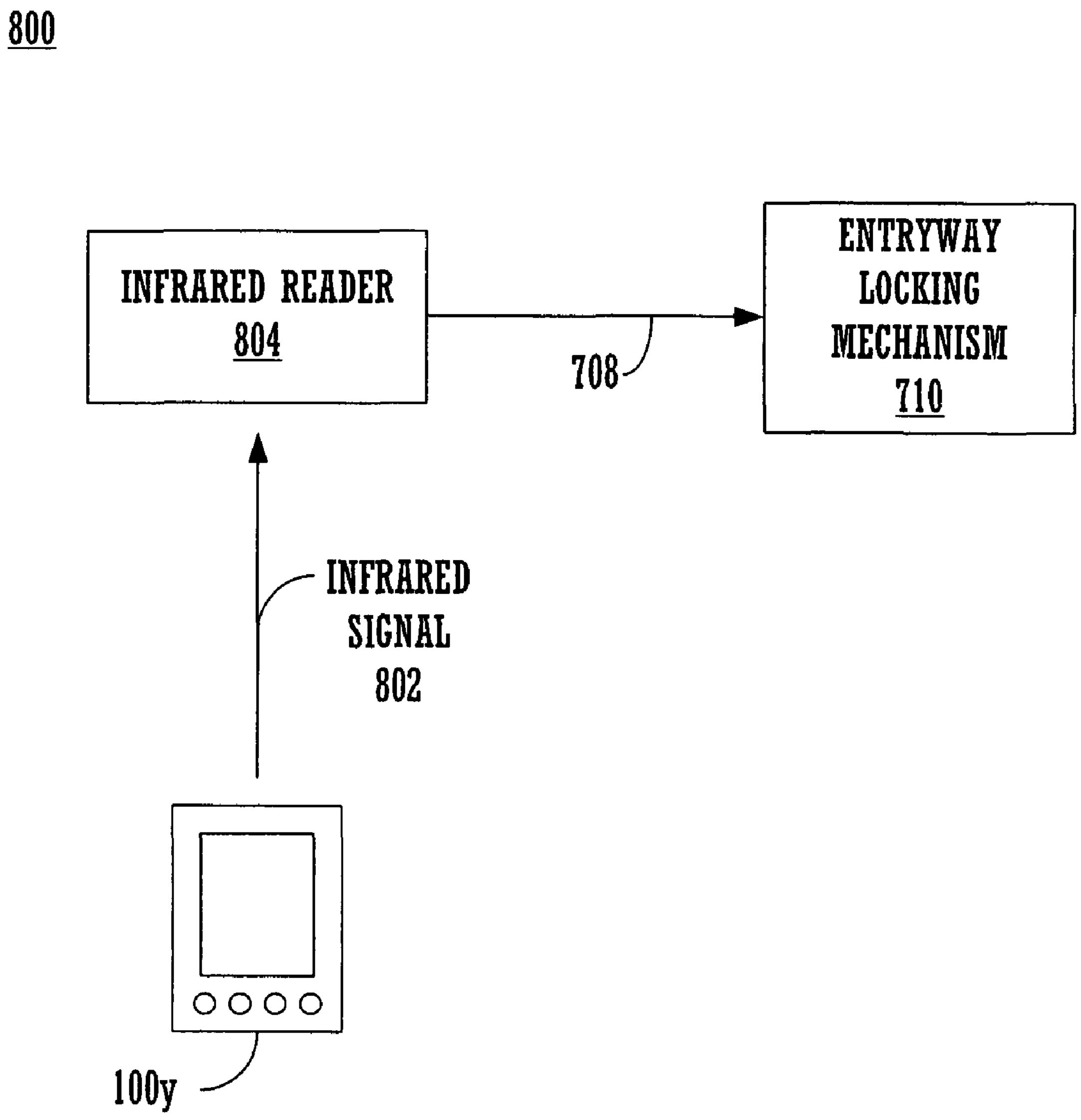
FIG. 8 illustrates a non-contact infrared security system in accordance with an embodiment of the present invention.

FIG. 8 illustrates a non-contact infrared security system 800 in accordance with an embodiment of the present invention wherein portable computer device 100*y* (e.g., personal digital assistant) can operate. The non-contact infrared security system 800 may be utilized to restrict unauthorized individuals from gaining access to a particular area such as a laboratory, building, and the like. Specifically, when an authorized infrared security code signal is received by an infrared reader device 804, it causes entryway locking mechanism 710 to temporarily unlock an entryway (not shown) enabling one or more individuals to pass through it. Portable computer device 100*y* is implemented with software in accordance with the present embodiment which enables it to output an infrared signal 802 containing an authorized security code via infrared communication mechanism 64. As such, portable computer system 100*y* has the capability of functioning as a "key" enabling entry into restricted areas which are secured with non-contact infrared security system 800.

Specifically, in order to utilize portable computer system 100*y* as a "key" for non-contact infrared security system 800, infrared communication mechanism 64 of portable computer system 100*y* is pointed at infrared reader device 804 and then activated to output infrared signal 802 containing an authorized security password or code (which may be unique and/or common). Upon receiving infrared signal 802, infrared reader device 804 determines whether the security code contained within infrared signal 802 is an authorized security code. If the security code is not an authorized security code, infrared reader device 804 does not cause the entryway to be unlocked. Conversely, if infrared reader 804 determines that the received security code of infrared signal 802 is authorized, infrared reader 804 outputs release signal 708 to entryway locking mechanism 710. Upon receiving release signal 708, entryway locking mechanism 710 unlocks the entryway enabling one or more individuals to pass through it.

As such, the personal identification security feature of portable computing device 100*y* includes infrared communication mechanism 64 along with software programming for controlling the transmission of infrared signal 802.

Referring to FIG. 8, it should be appreciated that the authorized security code or password output with infrared signal 802 is stored within a memory device (e.g., volatile memory unit 102, non-volatile memory unit 103, etc.) of portable computing device 100*y*. Furthermore, the authorized security code of infrared signal 802 can be initially programmed and stored within a memory device(s) in a wide variety of ways. For example, the authorized security code can be initially programmed and stored within a memory device of portable computer system 100*y* by interfacing with the controls of portable computer system 100*y*. Additionally, the authorized security code can be initially programmed and stored within a memory device of portable computer system 100*y* via communication interface 108 of portable computer system 100*y*.

It is appreciated that personal digital assistant 100*y* of the present embodiment utilizes processor 101 while functioning as a "key" within non-contact infrared security system 800. As such, additional software operating on processor 101 is capable of keeping track of the time and date (for example) personal digital assistant 100*y* enters and/or exits a restricted area such as a laboratory and/or building. In this manner, a personal log may be created by software operating on personal digital assistant 100*y* documenting its ingress and egress of restricted areas. It is understood that the present embodiment is well suited to accommodate a wide variety of software and/or hardware implementations which operate in conjunction with the "key" functionality of personal digital assistant 100*y*.

Within FIG. 8, it should be appreciated that portable computing device 100*y* of the present embodiment is well suited to be implemented as an extremely wide variety of devices. For example, portable computing device 100*y* may be implemented as a portable telephone, portable laptop computer system, personal digital assistant, pager, calculator, and the like.

Figure 9:
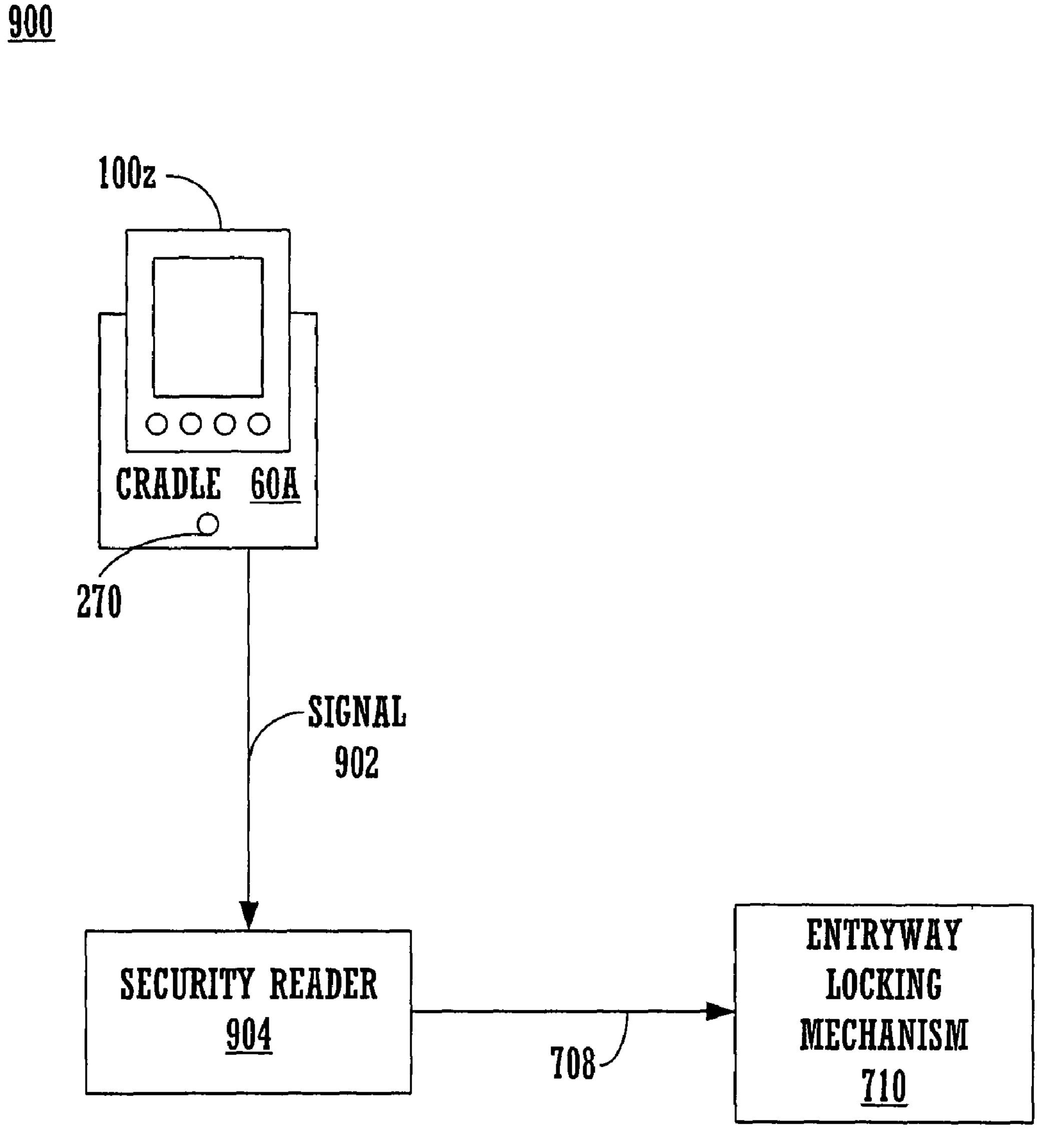
FIG. 9 illustrates a docking station security system in accordance with an embodiment of the present invention.

FIG. 9 illustrates a docking station security system 900 in accordance with an embodiment of the present invention wherein portable computer device 100*z* (e.g., personal digital assistant) may operate. The docking station security system 900 may be utilized to restrict unauthorized individuals from gaining access to a particular area such as a building, laboratory, and the like. Specifically, when an authorized security code signal is received by a security reader device 904 via a docking station (e.g., cradle 60*a*), it causes entryway locking mechanism 710 to temporarily unlock an entryway (not shown) enabling one or more people to pass through it. Portable computer device 100*z* is implemented with software in accordance with the present embodiment which enables it to output a signal 902 containing an authorized security code via communication interface 108 (FIG. 2B) when coupled to cradle 60*a*. As such, portable computer system 100*z* is capable of functioning as a "key" thereby enabling entry into restricted areas which are secured with docking station security system 900.

As described above, cradle 60*a* contains a mechanical and electrical interface 260 for interfacing with serial communication interface 108 of portable computer system 100*z* when system 100*z* is slid into the cradle 60*a* in an upright position. Once inserted, button 270 can be pressed to initiate two way communication between portable computer system 100*z* and a security reader device 904. During this communication, portable computing device 100*z* outputs signal 902 containing an authorized security code or password (which may be unique and/or common) which is received by cradle 60*a*. Subsequently, cradle 60*a* outputs signal 902 containing the security code to security reader device 904. Upon receiving signal 902, security reader device 904 determines whether the security code of signal 902 is an authorized security code. If the security code is not an authorized security code, security reader device 904 does not cause the entryway to be unlocked. However, if security reader device 904 determines that the received security code of signal 902 is authorized, security reader device 904 outputs release signal 708 to entryway locking mechanism 710. Upon receiving release signal 708, entryway locking mechanism 710 unlocks the entryway enabling one or more people to pass through it.

Therefore, the personal identification security feature of portable computing device 100*z* includes serial communication interface 108 along with software programming for controlling the transmission of signal 902 via communication interface 108.

Referring still to FIG. 9, it should be appreciated that the authorized security code or password output with signal 902 is stored within a memory device (e.g., volatile memory unit 102, non-volatile memory unit 103, etc.) of portable computing device 100*z*. Additionally, the authorized security code of signal 902 can be initially programmed and stored within a memory device(s) in a wide variety of ways. For example, the authorized security code 100*z* can be initially programmed and stored within a memory device of portable computer system by interfacing with the controls of portable computer system 100*z*. Moreover, the authorized security code can be initially programmed and stored within a memory device of portable computer system 100z via communication interface 108 of portable computer system 100z.

It is understood that personal digital assistant 100z of the present embodiment utilizes processor 101 while functioning as a “key” within docking station security system 900. Therefore, additional software operating on processor 101 has the capability of keeping track of the time and date (for example) personal digital assistant 100z enters and/or exits a restricted area such as a building and/or laboratory. In this manner, a personal log may be created by software operating on personal digital assistant 100z documenting its ingress and egress of restricted areas. It is appreciated that the present embodiment is well suited to accommodate a wide variety of software and/or hardware implementations which operate in conjunction with the “key” functionality of personal digital assistant 100z.

Within FIG. 9, it is understood that portable computing device 100z of the present embodiment is well suited to be implemented as an extremely wide variety of devices. For example, portable computing device 100z may be implemented as a portable telephone, portable laptop computer system, personal digital assistant, pager, calculator, and the like.

Figure 10:
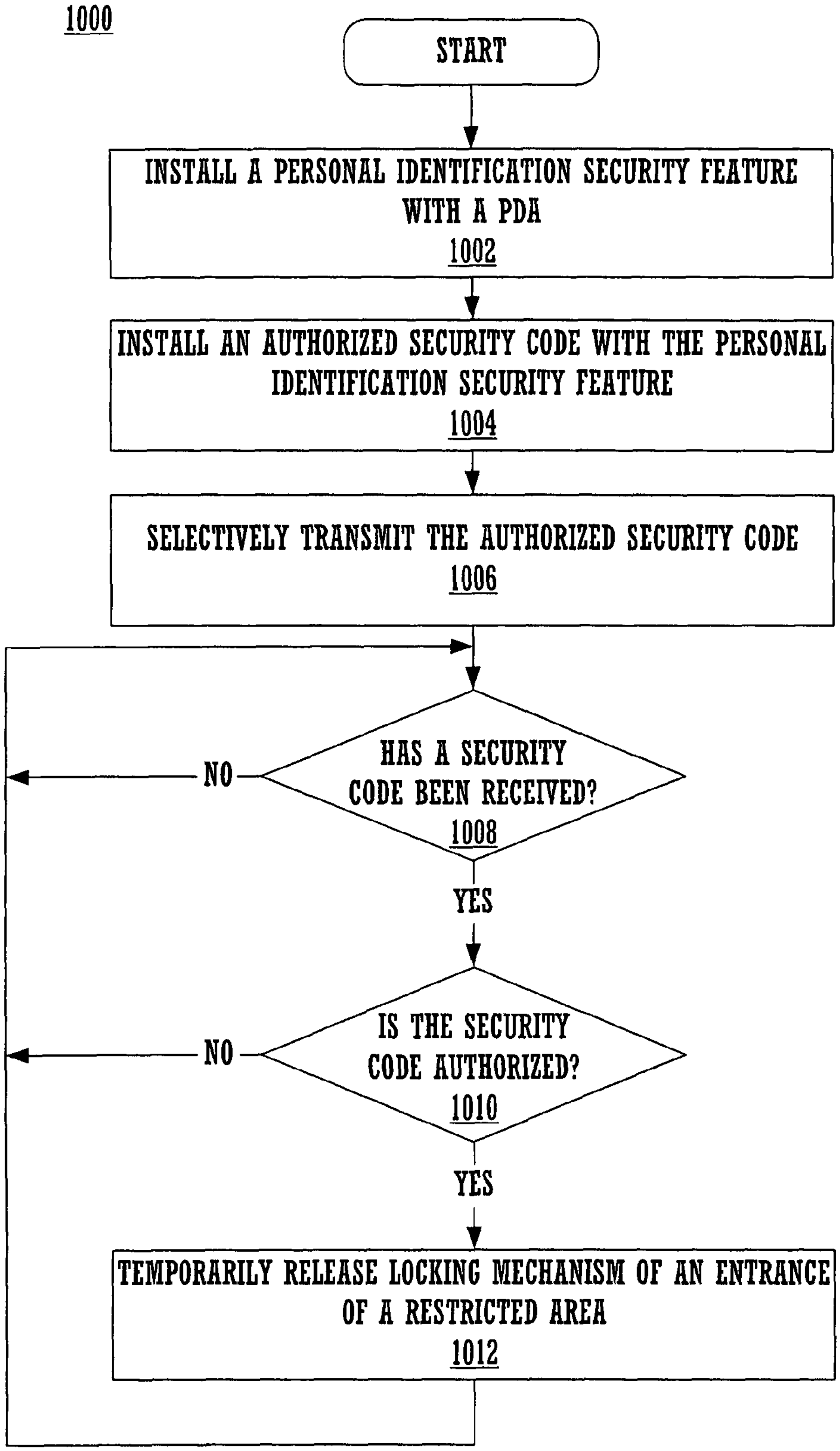
FIG. 10 is a flowchart of steps performed in accordance with one embodiment of the present invention.

FIG. 10 illustrates a flowchart 1000 of steps performed in accordance with one embodiment of the present invention for enabling a portable computing device to be utilized in conjunction with a personal identification security system. Flowchart 1000 includes processes of the present invention which, in one embodiment, are carried out by a processor and electrical components under the control of computer readable and computer executable instructions. Some or all of the computer readable and computer executable instructions may reside, for example, in data storage features such as computer usable volatile memory unit 102 and/or computer usable non-volatile memory unit 103 of FIG. 5. However, the computer readable and computer executable instructions may reside in any type of computer readable medium. Although specific steps are disclosed in flowchart 1000, such steps are exemplary. That is, the present invention is well suited to performing various other steps or variations of the steps recited in FIG. 10. Within the present embodiment, it should be appreciated that the steps of flowchart 1000 can be performed by software or hardware or any combination of software and hardware.

The general idea of flowchart 1000 is to install a personal identification security feature with a portable computing device (e.g., personal digital assistant). Once the personal identification security feature has been installed with an authorized security code, the portable computing device is capable of functioning as a “key” enabling entry into restricted areas which are secured with locking security systems such as corporate campuses, buildings, and/or laboratories. In this manner, an authorized person does not have to carry around a separate “key” in order to gain access to restricted areas.

At step 1002 of FIG. 10, the present embodiment installs a personal identification security feature with a portable computing device (e.g., 100). Within the present embodiment, the personal identification security feature is well suited to be implemented in a wide variety of different ways. For example, the personal identification security feature may include a radio frequency identification (RFID) tag or integrated circuit (e.g., 602). Furthermore, the personal identification security feature of the present embodiment may include a wireless transmitter (e.g., infrared communication mechanism 64) along with software programming for controlling the transmission of wireless (e.g., infrared) communication signals. Additionally, the personal identification security feature may include a wired communication interface (e.g., serial port, parallel port, and the like) together with software programming for controlling the transmission of communication signals. Moreover, the portable computing device of the present embodiment is well suited to be a wide variety of devices. For example, the portable computing device may include a portable laptop computer system, personal digital assistant, pager, portable communication device, calculator, and the like.

In step 1004, the present embodiment installs an authorized security code and/or password (which may be unique and/or common) with the personal identification security feature. For example, an authorized security code is stored within a memory device (e.g., 604) of a RFID tag (e.g., 602). Additionally, an authorized security code is stored within a memory device of the portable computing device. At step 1006, the present embodiment selectively transmits the authorized security code. It is appreciated that the authorized security code may be output in a wide variety of ways in accordance with the present embodiment. For example, the authorized security code may be output via wireless communication (e.g., radio frequency, infrared, etc.) and/or wired communication (e.g., serial port, parallel port, and the like).

At step 1008 of FIG. 10, the present embodiment determines whether a security code has been received. If the present embodiment determines that a security code has not been received during step 1008, the present embodiment proceeds to the beginning of step 1008. However, if the present embodiment determines that a security code has been received during step 1008, the present embodiment proceeds to step 1010. In step 1010, the present embodiment determines whether the received security code is an authorized security code. If the present embodiment determines that the received security code is not an authorized security code during step 1010, the present embodiment proceeds to the beginning of step 1008. Conversely, if the present embodiment determines that the received security code is an authorized security code during step 1010, the present embodiment proceeds to step 1012.

In step 1012, the present embodiment temporarily releases a locking mechanism of an entrance of a restricted area. In this manner, one or more individuals are able to gain access to the restricted area via the unlocked entrance. It should be appreciated that the amount of time the entrance is temporarily unlock during step 1012 is not limited to any particular amount of time. That is, the present embodiment is well suited to temporarily unlock the entrance for any amount of time. Upon the completion of step 1012, the present embodiment proceeds to the beginning of step 1008.

Accordingly, the present invention provides a method and system for incorporating non-contact keycard technology into another device (e.g., personal digital assistant, portable telephone, pager, calculator, etc.) that an authorized person typically carries around with them.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A system comprising:

a portable computing device;

a radio frequency identification circuit attached to said portable computing device;

wherein said radio frequency identification circuit comprises memory that stores a security code, said radio frequency identification circuit being energized by a radio frequency field produced by a reading device when said portable computing device is brought into said radio frequency field, said radio frequency identification circuit responding to being energized by outputting a signal containing said security code for reception by said reading device, said security code indicating authorization to enter a secure area such that said reading device permits access to said secure area upon reception and authentication of said security code.

2. The system of claim 1, wherein said radio frequency identification circuit comprises a radio frequency identification (RFID) tag.

3. The system of claim 1, wherein said radio frequency identification circuit comprises a radio frequency identification integrated circuit.

4. The system of claim 1, wherein said radio frequency identification circuit is disposed inside a housing of said portable computing device.

5. The system of claim 4, wherein said radio frequency identification circuit is disposed on a removable panel of said housing of said portable computing device so as to be inside said housing when said panel is in place on said portable computing device.

6. The system of claim 1, wherein said radio frequency identification circuit is communicatively coupled to a processor of said portable computing device, wherein said processor creates a log of usage of said security code by said radio frequency identification circuit to access said secure area.

7. The system of claim 1, wherein:

said radio frequency identification circuit is communicatively coupled to a processor of said portable computing device, and said security code of said radio frequency identification circuit is set using an interface of said portable computing device.

8. The system of claim 1, wherein said portable computing device comprises a telephone.

9. The system of claim 1, wherein said portable computing device comprises a portable computer.

10. The system of claim 1, further comprising a snap-on adapter sized to snap onto said portable computing device, wherein said radio frequency identification integrated circuit is disposed on said snap-on adapter.

11. The system of claim 10, wherein said portable computing device comprises a telephone and said snap-on adapter snaps onto said telephone.

12. The system of claim 11, wherein said snap-on adapter engages sides of said telephone so as to be disposed on a rear portion of said telephone.

13. A method comprising:

presenting a portable computing device having a radio frequency identification circuit attached thereto to gain access to a secure area;

wherein said radio frequency identification circuit comprises memory that stores a security code, said radio frequency identification circuit being energized by a radio frequency field produced by a reading device when said portable computing device is brought into said radio frequency field, said radio frequency identification circuit responding to being energized by outputting a signal containing said security code for reception by said reading device, said security code indicating authorization to enter said secure area such that said reading device permits access to said secure area upon reception and authentication of said security code.

14. The method of claim 13, wherein said radio frequency identification circuit is communicatively coupled to a processor of said portable computing device, wherein said method further comprises, with said processor, creating a log of usage of said security code by said radio frequency identification circuit to access said secure area.

15. The method of claim 14, wherein said log indicates dates and times at which said security code is used by said radio frequency identification circuit to access said secure area.

16. The method of claim 13, wherein:

said radio frequency identification circuit is communicatively coupled to a processor of said portable computing device, and said method comprises inputting said security code to said radio frequency identification circuit using an interface of said portable computing device.

17. The method of claim 13, further comprising snapping a snap-on adapter onto said portable computing device, wherein said radio frequency identification circuit is disposed on said snap-on adapter.

* * * * *